United States Patent [19]

Mowbray et al.

[11] 4,446,836
[45] May 8, 1984

[54] FUEL INJECTION PUMPING APPARATUS

[75] Inventors: Dorian F. Mowbray, Burnham; Ivor Fenne, Greenford; Richard J. Andrews, Guildford, all of England

[73] Assignee: Lucas Industries Public Limited Company, Birmingham, England

[21] Appl. No.: 425,965

[22] Filed: Sep. 28, 1982

[30] Foreign Application Priority Data

Oct. 23, 1981 [GB] United Kingdom ............... 8132016

[51] Int. Cl.³ ............................................ F02M 41/00
[52] U.S. Cl. .................................... 123/450; 123/458; 417/462
[58] Field of Search ................. 123/450, 458; 417/462

[56] References Cited

U.S. PATENT DOCUMENTS

| | | | |
|---|---|---|---|
| 3,439,624 | 4/1969 | Glikin et al. | 123/450 |
| 3,896,779 | 7/1975 | Omori et al. | 123/458 |
| 4,224,903 | 9/1980 | Mowbray | 417/462 |
| 4,401,082 | 8/1983 | Leblanc | 417/462 |

FOREIGN PATENT DOCUMENTS

| | | | |
|---|---|---|---|
| 1577919 | 10/1980 | United Kingdom | 123/450 |
| 2071874 | 9/1981 | United Kingdom | 123/450 |
| 2086491 | 5/1982 | United Kingdom | 123/450 |
| 2090341 | 7/1982 | United Kingdom | 123/450 |

*Primary Examiner*—Ira S. Lazarus
*Assistant Examiner*—Magdalen Moy

[57] ABSTRACT

A fuel injection pumping apparatus for supplying fuel to an internal combustion engine, includes an injection pump having a plunger movable inwardly by cam means to effect delivery of fuel and a valve operable to control the supply of fuel to the bore containing the plunger. The valve is electrically controlled and the apparatus includes an electronic control system which is supplied with signals from transducers which are responsive to the positions of the cam means and a rotary part of the apparatus relative to the housing of the apparatus. The control system has information stored therein regarding the profile of the cam means, and controls the operation of the valve so that the correct amount of fuel is supplied to the bore.

7 Claims, 7 Drawing Figures

FUEL INJECTION PUMPING APPARATUS

This invention relates to a fuel injection pumping apparatus of the rotary distributor type and comprising a housing, a rotary distributor member mounted in the housing and adapted to be driven in timed relationship with an associated engine, a bore formed in the distributor member and a plunger slidable therein, cam means defining a leading flank for imparting inward movement to the plunger as the distributor member rotates and a trailing flank which allows the plunger to move outwardly, a delivery passage in the distributor member, said delivery passage communicating with said bore and opening onto the periphery of the distributor member for registration in turn with a plurality of outlets during successive inward movements of the plunger, said outlets in use being connected to the injection nozzles respectively of the associated engine, a low pressure pump for supplying fuel to said bore and means for controlling the quantity of fuel supplied to the bore whilst the plunger is allowed to move outwardly.

Such apparatus is well known in the art and various methods are known for controlling the amount of fuel which is supplied to the bore and hence the amount of fuel which is delivered to the associated engine. The most common method of control is to use a throttle and while this method is simple it is not a precise method since the amount of fuel supplied during the filling period depends on many factors such for example as the duration in terms of time of the filling period, the pressure of the fuel and its viscosity. A more precise method of control is to use a shuttle which has adjustable stops. This method of control has its disadvantages because the hydraulic circuit needed to operate the shuttle requires valves to control the fuel flow to and from the ends of the cylinder in which the shuttle is mounted. It is however possible to obtain a signal indicative of the amount of fuel supplied to the bore.

Another method of controlling the amount of fuel supplied to the bore is to provide a stop or stops which limit the extent of outward movement of the plunger. Adjustable stops located in the housing are known but these in general require complex mechanisms to operate and also occupy considerable space. In another arrangement these stops are fixed and the distributor member is axially adjustable so that depending on the axial position of the distributor member so the amount of fuel which can be supplied to the bore is controlled. The signal which represents the fuel quantity can be obtained by measuring the axial position of the distributor member. This form of apparatus has an increased axial length as compared with the well known form of the apparatus.

It is an object of the invention to provide an apparatus of the kind specified in a simple and convenient form and in which the quantity of fuel which is supplied to the associated engine can be precisely controlled and which can provide a signal indicative of the fuel quantity.

According to the invention, in an apparatus of the kind specified the means for controlling the amount of fuel supplied to said bore comprises an electrically controlled on/off valve interposed between the low pressure supply pump and the bore and electronic means for controlling said on/off valve, said electronic means being responsive to the relative angular position of the trailing flank of the cam means and the distributor member, whereby the valve is closed to prevent further flow of fuel to the bore when said relative angular position attains a predetermined value.

Examples of fuel pumping apparatus in accordance with the invention will now be decribed with reference to the accompanying drawings in which.

Figure 1:
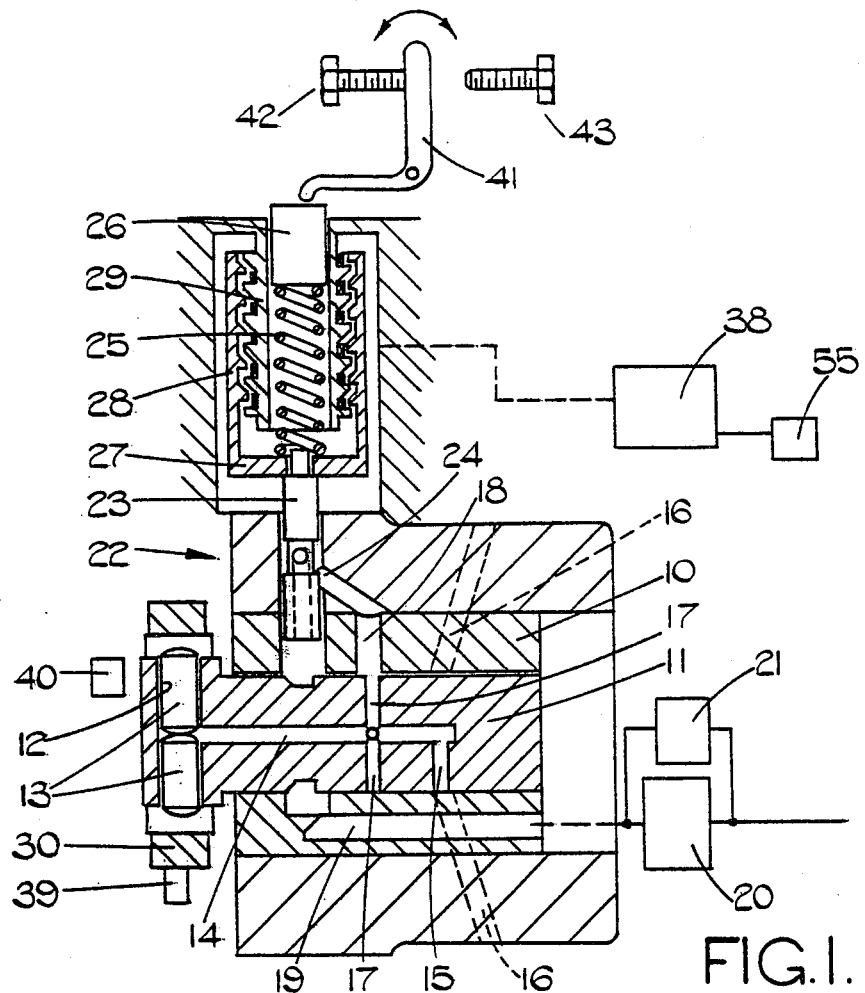
FIG. 1 is a diagrammatic sectional side elevation of one example of the apparatus.
Figure 2:
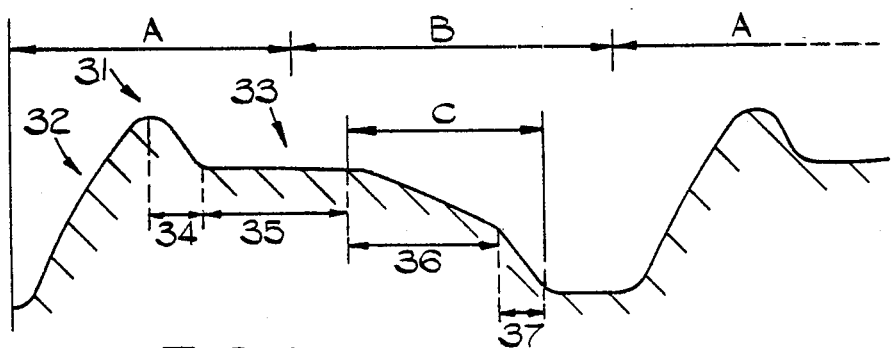
FIG. 2 is a developed view of the internal peripheral surface of a portion of the apparatus seen in FIG. 1.

Referring to FIGS. 1 and 2 of the drawings, the apparatus comprises a housing 10 in which is journalled a rotary cylindrical distributor member 11. The distributor member is coupled by means not shown, to a drive shaft which in use is driven in timed relationship with the associated engine. Formed in the distributor member is a transversely extending bore 12 in which is mounted a pair of pumping plungers 13. Formed in the distributor member is a longitudinal passage 14 which communicates with a radially extending delivery passage 15 which can register in turn with a plurality of delivery ports 16 formed in the housing 10 and connected in use, to the injection nozzles respectively of the associated engine.

The longitudinal passage 14 also communicates with a plurality of radially extending inlet passages 17 which communicate in turn as the distributor member rotates with an inlet port 18 formed in the housing. The port 18 communicates with a fuel supply passage 19 which is connected to the outlet of a low pressure supply pump shown at 20 and which draws fuel from a source of fuel. The output pressure of the pump 20 is controlled by means of a valve 21.

Intermediate the port 18 and the passage 19 is an on/off valve which is generally indicated at 22 and which comprises an axially movable member 23 in the periphery of which is formed a groove which is in constant communication with the passage 19. The member 23 is slidable within a cylinder and opening into the cylinder is a port 24 which communicates with the port 18.

The member 23 is subject to the output pressure of the low pressure pump 20 which acts to urge the member to the valve closed position. The movement of the member 23 is opposed by the action of a coiled compression spring 25 one end of which is located against an abutment 26 and the other end of which bears against the end face 27 of a hollow cylindrical armature 28, the end face 27 bearing against a step defined on the member 23. The armature 28 moves upwardly against the action of the spring to permit the member 23 to move to the valve closed position, when a winding which is carried about a core member 29, is energised. The armature and the core member is provided with helical pole pieces and the armature is shown in the position it adopts when the winding is not energised.

For effecting inward movement of the plungers 13 there is provided an annular cam ring 30 which has cam lobes indicated at 31 in FIG. 2, on its internal peripheral surface. In practice the outer ends of the plungers engage shoes which carry rollers for engagement with the internal peripheral surface of the cam.

As will be seen from FIG. 2 each cam lobe 31 has a leading flank 32 and a trailing flank generally indicated at 33. The trailing flank includes a number of discrete zones. The first such zone is referenced 34 and extends from the crest of the cam lobe to a plateau indicated at 35. The purpose of the zone 34 is to permit delivery valves which are located in the outlets 16 respectively to close and in so doing cause a predetermined volume of fuel to be retracted from the lines which connect the outlet ports and the injection nozzles. The plateau 35 holds the plungers 13 against movement. The next zone is that which is indicated at 36 and this extends from the end of the plateau 35. The profile of the zone 36 has a low rate so that the plungers can follow the cam lobe. The fourth zone is that which follows from the third zone and is indicated at 37. The profile of this portion of the trailing flank is steeper and it leads to the base circle of the cam.

The delivery passage 15 registers with an outlet port 16 during the time the plungers are under the control of the portion of the cam lobe which is assigned the reference letter A. It will be seen that this embraces the leading flank of the cam lobe, the zone 34 and a portion of the plateau 35. The delivery passage moves out of register with an outlet 16 and an inlet passage 17 moves into register with the inlet port 18 and remains in register therewith during the period which is indicated at B. This period embraces a portion of the plateau 35 and the zones 36 and 37 together with a portion of the base circle of the cam.

It will thus be seen that when the plunger is moved inwardly by the action of the leading flank of the cam lobe, fuel is displaced from the bore to an outlet 16. The instant at which the plunger is moved inwardly depends upon the amount of fuel supplied to the bore and hence the amount of separation of the plungers. When the plunger rides over the crest of the cam lobe it is allowed to move outwardly to retract fuel as previously mentioned and is then held against movement by the plateau 35. The plunger is allowed to move outwardly when it reaches the end of the plateau 35 and the extent of outward movement which occurs during the zone 36 is controlled by the valve 22 and the profile of the cam. The valve can be opened during the period A since during this time inlet passages 17 are out of register with the port 18. The valve will be closed sometime during the period which is indicated at C. The period C covers the zones 36 and 37. For normal operation the valve will be closed sometime in the zone 36 but when it is required to supply an excess of fuel to the engine for example when starting the engine, the valve will not be closed until the end of period C.

The contour of the trailing flank of the cam lobe in zone 36 is as has been mentioned, such that the plunger can follow the cam lobe and therefore by measuring the relative angular position of the cam ring and the distributor member, the valve can be closed at a predetermined relative angular position so that the volume of fuel which has been admitted to the bore is known.

Figure 6:
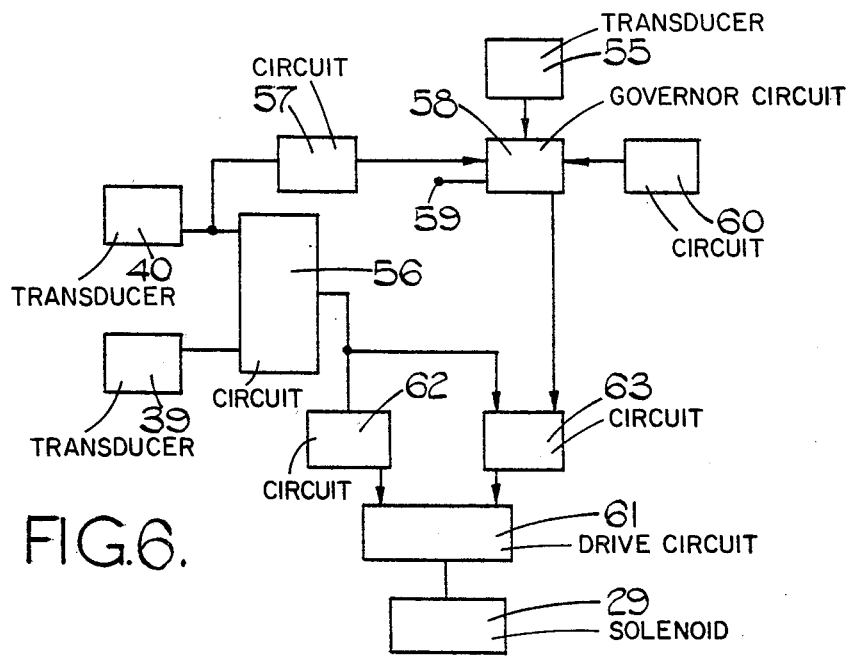
FIG. 6 is a block circuit diagram of a part of the apparatus shown in FIG. 2.

The control of the electric current flow in the winding of the on/off valve is effected by a control system generally indicated at 38 and shown in block form in FIG. 6. The circuit receives an input from a transducer 39 associated with the cam ring, and a further transducer 40 which provides an indication of the angular position of the distributor member. The control circuit 38 receives a demand signal from a transducer 55, and also provides a governing function and it can also take into account various engine operating parameters such for example as the temperature and air pressure.

With reference to FIG. 6 the signals from the transducers 39 and 40 are supplied to a circuit 56 which computes the angular position of the distributor member 11 relative to the cam ring 39. The output of the transducer 40 is also supplied to a circuit 57 which provides a signal to a governor circuit 58, indicative of the speed of rotation of the distributor member and hence the associated engine. The governor circuit receives the signal from the transducer 55 and also signals at an input 59 representative of various engine operating parameters such as the engine temperature and the air pressure. The circuit 58 also receives from a circuit 60 signals which represent for example the maximum fuel which can be supplied to the engine these signals therefore acting to limit the fuel. The output signal from the governor circuit is the required fuel signal.

Also provided is a drive circuit 61 for the solenoid 29 and this is controlled by two circuits 62, 63 each of which receives the output of the circuit 56, the circuit 63 alone receiving the output of the governor circuit 58. The circuit 62 detects the position of the distributor member and effects opening of the on/of valve by causing energisation of the solenoid at the end of the plateau 35. The circuit 63 also detects the position of the distributor member but also takes into account the amount of fuel required so that the on/off valve is closed during the period C and in normal operation of the engine as when excess fuel is not required, during zone 36.

In the event of failure of the control system or some component associated therewith, it is possible for the on/off valve 22 to act as a throttle and an hydraulic governor. For this purpose the abutment 26 is movable under the action of a lever 41 which for emergency purposes, can be operated by the operator of the engine. As the output pressure of the pump increases, the member 23 will move against the action of the spring 25 to reduce the effective size of the port 24 in the same manner as a known form of hydraulic governor. Stops 42, 43 are provided for the lever 41, these stops providing a control of the maximum speed and idling speed respectively of the associated engine.

Figure 3:
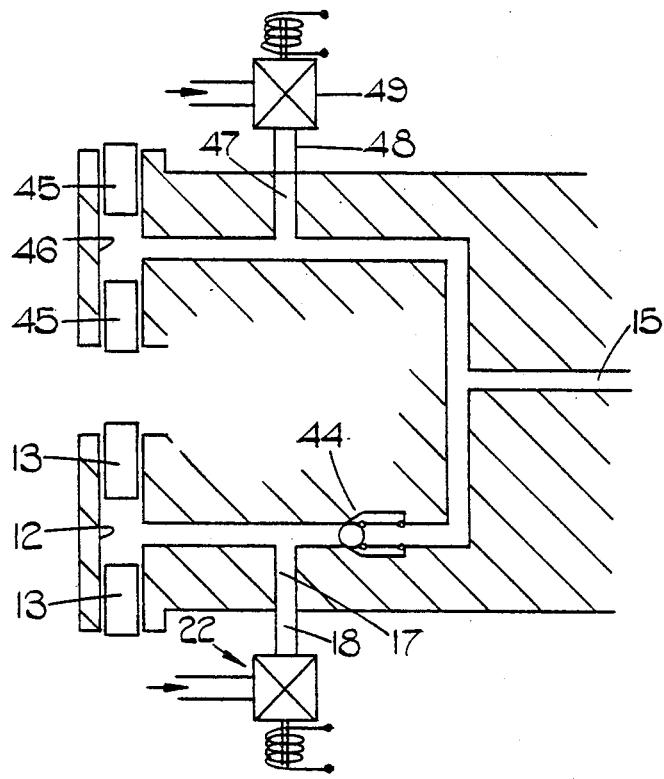
FIGS. 3 and 4 show modifications of the apparatus shown in FIG. 1.

Referring now to FIG. 3. This shows an apparatus which operates in a similar fashion to the apparatus described with reference to FIGS. 1 and 2 but in addition can supply an initial quantity of fuel at a reduced rate in advance of the main quantity of fuel. This is to improve the combustion characteristics of the associated engine. For this purpose the passage which connects the bore 12 with the delivery passage 15 contains a non-return valve indicated at 44. The inlet passages 17 communicate with the bore 12 as in the example of FIG. 1 and the passages 17 can communicate with an inlet port 18 the flow of fuel through which is controlled by the valve 22 in the same manner as the example described in FIG. 1. In addition, a further pair of plungers 45 is provided and these are located within a bore 46 which is directly connected with the passage 15. The bore 46 is filled through a further set of inlet passages 47 from a port 48 the flow of fuel through which is controlled by a valve 49. The plungers 45 since they are intended for delivering fuel at a lower rate can be smaller than the plungers 13. The amount of fuel supplied to the bores 12 and 46 is independently controlled by the valves 22 and 49 respectively. The plungers 45 however are actuated earlier than the plungers 13 so that initially the plungers 45 alone deliver fuel to the engine. The main volume of fuel is supplied by the plungers 13 and when they move inwardly the fuel flows past the non-return valve 44. The plungers 45 also contribute to the main volume of fuel and both pairs of plungers can be opera- ted by the same cam which would be of increased axial length for this purpose. At the end of the filling stroke the plungers 45 must project more than the plungers 13 to ensure that they are moved inwardly before the plungers 13. The valve 44 acts to ensure that no fuel displaced by the plungers 45 flows into the bore 12. As shown the valve 44 is a simple non- return valve and it will close immediately delivery of fuel ceases. It will not therefore assist in unloading the supply lines in the manner described with reference to FIG. 1. If it should prove necessary to use the plungers 13 in the unloading of the supply lines, the valve 44 can be replaced by an unloading valve. With the arrangement shown in FIG. 3 fuel will flow into an inlet passage 17 as soon as it is brought into register with the port 18. This will permit the plungers 13 to assume the position as determined by the plateau 35. The control of the additional valve 49 can be effected in a similar manner to that described.

Figure 4:
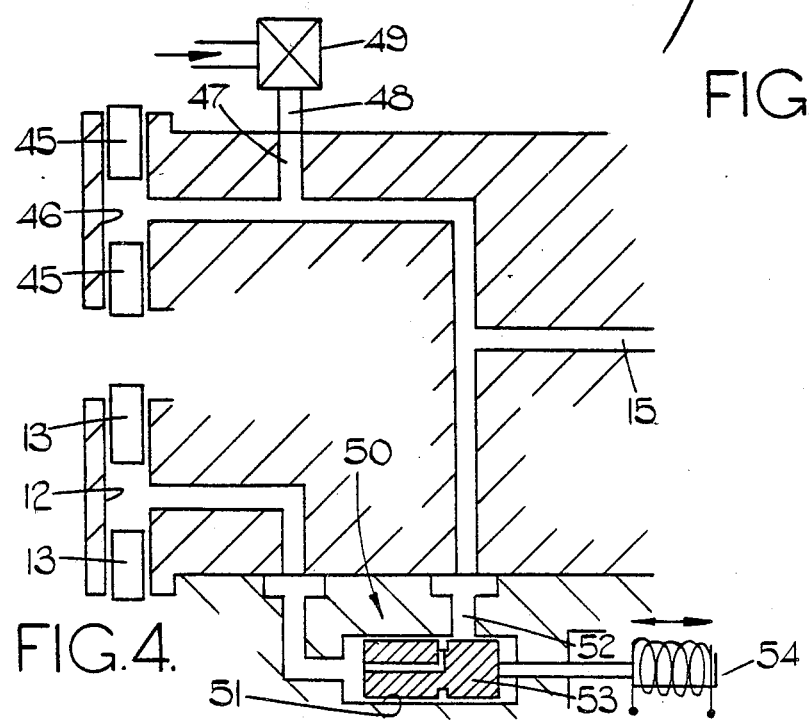

A modified version of the arrangement shown in FIG. 3 is shown in FIG. 4 and identical reference numerals are used wherever possible. In this example the bore 12 is connected to the passage 15 through a control valve generally indicated at 50. This valve comprises a cylinder 51 one end of which is connected to the bore 12 in a permanent fashion. The cylinder has a port 52 in its side wall which is permanently connected to the passage 15. In addition, the valve includes a valve member 53 slidable within the cylinder and having a circumferential groove for registration with the port 52, the groove being in constant communication with the end of the cylinder which is connected to the bore 12. The valve member 53 can be moved to a position in which the port 52 is closed, by means of an electro-magnetic device 54.

Figure 5:
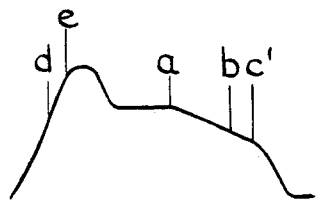
FIG. 5 is a timing diagram for the apparatus shown in FIG. 4.

FIG. 5 shows the timing sequence of the apparatus. Starting with the filling stroke, the valve 49 is opened at instant a to fill the bores 46 and 12, valve 50 being open. At instant b valve 50 is closed to determine in part the volume of fuel which is delivered during the main injection period. At instant c valve 49 is closed which sets the start of the pilot injection of fuel. As the distributor member rotates the plungers 45 will move inwardly at point d to deliver the initial quantity of fuel. During this period the valve 50 is closed but is is opened at the end of the initial delivery of fuel (point e). When the valve 50 is opened the continued inward movement of the plungers 45 merely displaces fuel into the bore 12 but when the plungers 13 start to move inwardly, both sets of plungers delivery fuel to the delivery passage 15. The fact that the valve 50 is opened before the plungers 13 start to move inwardly ensures that there is a break in the supply of fuel to the engine.

The operation of the valves 49 and 50 in the example of FIG. 4 has to be carefully worked out to ensure that the volume of the initial quantity of fuel, its timing in relation to the main quantity, together with the interval between the initial and main delivery and the volume of the main quantity of fuel are correct. The instants at which the valves should be operated can however be worked out since the profiles of the leading and trailing flanks of the cam lobes are known.

Figure 7:
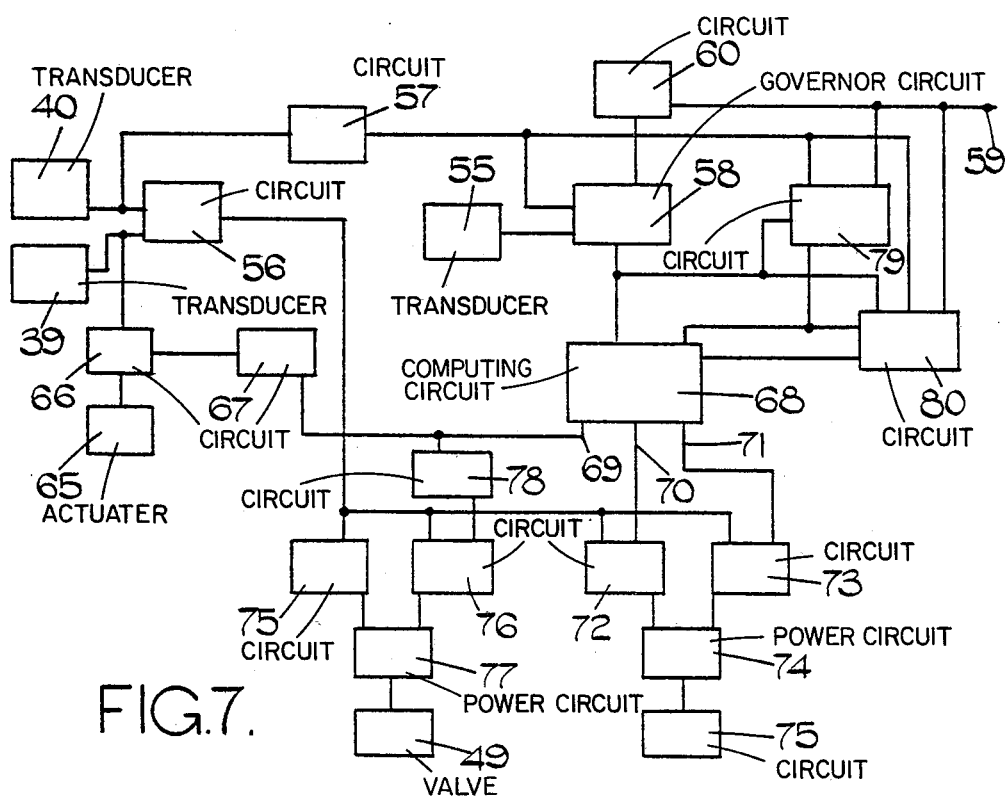
FIG. 7 is a block circuit diagram for the apparatus shown in FIG. 4.

FIG. 7 shows the modifications which are necessary to the control system to operate the valves shown in the example of FIGS. 4 and 5. The portions of the control system which correspond to the system of FIG. 6 are provided with the same reference numerals.

The cam ring 30 is adjustable by means of an actuator 65 which is electrically controlled. Power is supplied to the actuator by means of a circuit 66 which receives the cam position signal from the transducer 39 and also a desired cam position signal from a circuit 67 which receives a first output 69 from a computing circuit 68. The computing circuit has two further outputs 70 and 71 and these are connected to circuits 72, 73 respectively each of which receives the output from the circuit 56. The circuits 72, 73 correspond to the circuits 62, 63 of the system of FIG. 6 and control the operation of a power circuit 74 which supplies power to the winding 54 associated with the valve 50.

Circuits 75, 76 control a power circuit 77 associated with the valve 49, the circuits 75, 76 being similar to the circuits 72, 73 and both circuits receive an input from the circuit 56. The circuit 76 has a further input which is connected to a circuit 78 having its input connected to the output 69 of the computing circuit 68.

The computing circuit 68 receives the output signal from the governor circuit 58 and this same signal is applied to a circuit 79 together with the speed signal from the circuit 57 and the signal or signals at the input 59. The same three signals are also supplied to a circuit 80. The output of the circuit 79 is supplied as a second input to the computing circuit 68 and also to the circuit 80, to the output of which provides a third input to the computing circuit.

The circuit 79 on the basis of the engine speed, the amount of fuel to be supplied to the engine and the other engine operating parameters, determines the pilot volume of fuel required to be delivered in advance of the main quantity of fuel and the circuit 80 on the basis of the same information but in addition including the pilot volume fuel determines the interval required between the end of the delivery of the pilot quantity and the start of delivery of the main quantity. For this purpose the circuits will contain stored information.

The computing circuit on the basis of the three inputs supplied to it and stored information relative to the cam, determines the points d, b and e shown in the diagram of FIG. 5, this information appearing at the outputs 69, 70 and 71 respectively. For this purpose it has to solve three equations. The point c of FIG. 4 is determined by circuit 78 from the information relative to point d and the circuits 75, 76, 72 and 73 detect the position of the distributor member for points a, c, b and e respectively. The cam position required to ensure that point d is established is determined by circuit 67.

We claim:

1. A fuel injection pumping apparatus of the rotary distributor type comprising a housing, a rotary distributor member mounted in the housing and adapted to be driven in timed relationship with an associated engine, a bore formed in the distributor member and a plunger slidable therein, cam means defining a leading flank for imparting inward movement to the plunger as the distributor member rotates and a trailing flank which allows the plunger to move outwardly, a delivery passage in the distributor member, said delivery passage communicating with said bore and opening onto the periphery of the distributor member for registration in turn with a plurality of outlets during successive inward movements of the plunger, said outlets in use being connected to the injection nozzles respectively of the associated engine, a low pressure pump for supplying fuel to said bore, means for controlling the quantity of fuel supplied to the bore whilst the plunger is allowed to move outwardly, said means comprising an electrically controlled on/off valve interposed between the low pressure supply pump and the bore and electronic means for controlling said on/off valve, said electronic means being responsive to the relative angular position of the trailing flank of the cam means and the distributor member, whereby the valve is closed to prevent further flow of fuel to the bore when said relative angular position attains a predetermined value.

2. An apparatus according to claim 1 in which said electronic means includes first and second transducers carried by the housing and responsive to the positions of the cam means and the distributor member within the housing, and a first means which receives the signals provided by said transducers and provides a signal representative of the position of the distributor member relative to the cam means.

3. An apparatus according to claim 2 in which said electronic means includes a power circuit for said valve, second means for providing a first signal to said power circuit to open said valve and third means for providing a second signal to said power circuit to close said valve, said second and third means each receiving a signal from said first means, said second means providing said first signal to the power circuit when the relative position of the cam means and the distributor member attains a predetermined value, said electronic means including a governor means which supplies a signal to said third means representing the required amount of fuel to be delivered by the apparatus, said third means determining from the signals provided by said first means and said governor means the instant at which said second signal is generated to close said valve.

4. An apparatus according to claim 1 including a further plunger housed in a further bore in the distributor member, said further bore being connected to said delivery passage, a one-way valve interposed between said first mentioned bore and said delivery passage, and a further electrically controlled on/off valve for controlling fuel flow to said further bore.

5. An apparatus according to claim 1 including a further pair of plungers housed in a further bore in the distributor member, said further bore being connected to said delivery passage, valve means interposed between said first mentioned bore and said delivery passage, and electrically controlled actuator means for controlling the operation of said valve means.

6. An apparatus according to claim 5 in which said valve means is constructed to prevent fuel flow from said further bore to said first mentioned bore during inward movement of said further plunger, but to allow fuel flow from said first mentioned bore to said delivery passage during inward movement of said first mentioned plunger, said valve means being movable to an open position during inward movement of said further plunger to temporarily terminate the supply of fuel to the delivery passage from said further bore, said valve means during the supply of fuel to said bores being controllable to determine the relative amounts of fuel supplied to the bores.

7. An apparatus according to claim 4 or claim 5, in which said further plunger has a smaller area than said first mentioned plunger.

* * * * *